United States Patent

Watfa et al.

(10) Patent No.: US 12,022,560 B2
(45) Date of Patent: Jun. 25, 2024

(54) OPERATION OF A USER EQUIPMENT AND A TELECOMMUNICATION NETWORK

(71) Applicant: Samsung Electronics Co., Ltd., Suwon-si (KR)

(72) Inventors: Mahmoud Watfa, Staines (GB); Lalith Kumar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 356 days.

(21) Appl. No.: 17/651,377

(22) Filed: Feb. 16, 2022

(65) Prior Publication Data

US 2022/0264695 A1    Aug. 18, 2022

(30) Foreign Application Priority Data

Feb. 16, 2021 (IN) .............................. 202131006476
Feb. 26, 2021 (IN) .............................. 202131008212
Feb. 15, 2022 (GB) .................................. 2201975.6

(51) Int. Cl.
*H04W 76/28* (2018.01)
*H04L 69/28* (2022.01)
*H04W 4/70* (2018.01)
*H04W 16/08* (2009.01)
*H04W 48/18* (2009.01)
*H04W 52/02* (2009.01)
*H04W 76/10* (2018.01)
*H04W 76/19* (2018.01)
(Continued)

(52) U.S. Cl.
CPC .......... *H04W 76/28* (2018.02); *H04W 76/19* (2018.02); *H04W 76/38* (2018.02)

(58) Field of Classification Search
CPC ..... H04W 76/28; H04W 76/19; H04W 76/38; H04W 84/042; H04W 52/0206; H04W 16/08; H04W 48/18; H04W 76/30; H04W 76/20; H04W 4/70; H04W 76/10; H04W 88/02; H04L 69/28
USPC ........................................................ 370/311
See application file for complete search history.

(56) References Cited

U.S. PATENT DOCUMENTS 10,791,588 B2    9/2020  Martinez Tarradell et al.
2018/0324866 A1  11/2018 Lee et al.
2022/0210670 A1* 6/2022 Kawasaki ............. H04W 24/02

FOREIGN PATENT DOCUMENTS

WO    2016/053846 A1    4/2016
WO    2017/074240 A1    5/2017

OTHER PUBLICATIONS

3GPP TS 24.526 V17.1.0 (Dec. 2020); Technical Specification; 3rd Generation Partnership Project; Technical Specification Group Core Network and Terminals; User Equipment (UE) policies for 5G System (5GS); Stage 3 (Release 17); 52 pages.
(Continued)

*Primary Examiner* — Inder P Mehra

(57) ABSTRACT

The disclosure relates to a 5G or 6G communication system for supporting a higher data transmission rate. Disclosed is a method of controlling timer T3440 or T3540 in a User Equipment, UE, the timer being operable to guard a time during which the UE maintains a certain type of connection to a telecommunication network, wherein the timer has a default first time period in the absence of a first condition and a second condition being met, wherein if both the first condition and the second condition are met, then the first default time period is extended to a second time period.

18 Claims, 4 Drawing Sheets

(51) Int. Cl.
  *H04W 76/20* (2018.01)
  *H04W 76/30* (2018.01)
  *H04W 76/38* (2018.01)
  *H04W 84/04* (2009.01)
  *H04W 88/02* (2009.01)

(56) References Cited

OTHER PUBLICATIONS

3GPP TS 24.501 V17.1.0 (Dec. 2020); Technical Specification: 3rd Generation Partnership Project; Technical Specification Group Core Network and Terminals; Non-Access-Stratum (NAS) protocol for 5G System (5GS); Stage 3; (Release 17); 769 pages.
Oppo, "Discussion on CT1 LS on NAS procedure guard timers for GEO satellite", 3GPP TSG-RAN WG2 Meeting #112-e, Nov. 2-13, 2020, R2-2009377, 2 pages.
"3rd Generation Partnership Project; Technical Specification Group Core Network and Terminals; Non-Access-Stratum (NAS) protocol for 5G System (5GS); Stage 3; (Release 17)", 3GPP TS 24.501 V17.1.0 (Dec. 2020), 746 pages.
"3rd Generation Partnership Project; Technical Specification Group Core Network and Terminals; Non-Access-Stratum (NAS) protocol for Evolved Packet System (EPS); Stage 3 (Release 17)", 3GPP TS 24.301 V17.1.0 (Dec. 2020), 586 pages.
"3GPP TS 24.501 V16.3.0 (Dec. 2019)", 644 pages.
"3rd Generation Partnership Project; Technical Specification Group Core Network and Terminals; Non-Access-Stratum (NAS) protocol for Evolved Packet System (EPS); Stage 3 (Release 16)", 3GPP TS 24.301 V16.7.0 (Dec. 2020), 603 pages.
Combined Search and Examination Report under Sections 17 and 18(3) dated Aug. 4, 2022 in connection with United Kingdom Patent Application No. GB2201975.6, 7 pages.
International Search Report dated May 23, 2022 in connection with International Patent Application No. PCT/KR2022/002280, 3 pages.
Written Opinion of the International Searching Authority dated May 23, 2022 in connection with International Patent Application No. PCT/KR2022/002280, 6 pages.
Supplementary European Search Report dated Mar. 18, 2024, in connection with European Patent Application No. 22756484.6, 12 pages.
Ericsson, "Further discussion on NAS timers for CE", R2-162803, 3GPP TSG-RAN WG2 #93bis, Dubrovnik, Croatia, Apr. 2016. 3 pages.

\* cited by examiner

OPERATION OF A USER EQUIPMENT AND A TELECOMMUNICATION NETWORK

CROSS-REFERENCE TO RELATED APPLICATIONS

This application is based on and claims priority under 35 U.S.C. § 119 to Indian Provisional Patent Application Nos. 202131006476 and 202131008212, filed on Feb. 16, 2021 and Feb. 26, 2021, in the Indian Intellectual Property Office, and GB Patent Application No. 2201975.6 filed on Feb. 15, 2022, in the United Kingdom Intellectual Property Office, the disclosures of which are incorporated by reference herein in their entirety.

BACKGROUND

1. Field

The present disclosure relates to a method for Setting a Value for Non-Access Stratum (NAS) timers based on a User Equipment, UE, mode of operation.

2. Description of Related Art 5G mobile communication technologies define broad frequency bands such that high transmission rates and new services are possible and can be implemented not only in "Sub 6 GHz" bands such as 3.5 GHz, but also in "Above 6 GHz" bands referred to as mmWave including 28 GHz and 39 GHz. In addition, it has been considered to implement 6G mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive MIMO for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as V2X (Vehicle-to-everything) for aiding driving determination by autonomous vehicles based on information regarding positions and states of vehicles transmitted by the vehicles and for enhancing user convenience, NR-U (New Radio Unlicensed) aimed at system operations conforming to various regulation-related requirements in unlicensed bands, NR UE Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service-based architecture or service-based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting AR augmented reality (AR), Virtual Reality (VR), Mixed Reality (MR) and the like, 5G performance improvement and complexity reduction by utilizing Artificial Intelligence (AI) and Machine Learning (IL), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

Non-access stratum (NAS) timers are started when a NAS message is sent by the UE or the network (e.g., Access and Mobility Management Function (AMF) or Session Management Function (SMF)). A transmitting entity (e.g., UE or network) starts a NAS timer when a NAS message is sent, and if the timer expires before a response is received, then the transmitting entity will re-send the NAS message. This process can continue up to 5 NAS re-transmissions after which the procedure will be aborted.

NAS timers are set in a way that considers the delays at the lower layers. For example, when a CIoT UE operates in Coverage Enhancement (CE_mode B, or CE mode A, or in NB-IoT, then the lower layers will require more time to send a NAS message. Therefore, the NAS entity will apply longer NAS timers to make-up for the lower layer delays. This is important because if the NAS timers are not extended, then the NAS timer will expire, and the procedure may be re-attempted for 5 times without success. The NAS will then abort the procedure. So, it is quite important for the NAS to apply longer values when certain mode of operation is used by the UE such that lower layer delays are expected.

As an example, when the UE is in NB-IoT mode, the mobility management (5GMM) NAS timers are increased by 240 s, whereas the session management (5GSM) timers are increased by 180 s (see section 4.17 and 4.18 in TS 24.501).

There are cases in which the UE in connected mode would start a timer which is referred to as T3540. Note that the conditions to start the timer are based on receiving a specific message by the UE including other conditions that should be met. The details for starting this timer are described in section 5.3.1.3.

The purpose of this timer is for the UE to determine if the NAS connection will be locally released or not. For example, of the condition to start the timer is when the UE receives a Service Accept message and no user-plane resources have been established. In this case, the UE starts T3540 and waits to see if any NAS message will be received. If the UE receives a downlink NAS message, then the UE will stop T3540. Otherwise, if T3540 expires without receiving any message from the network, then the UE will locally release the NAS message.

Due to the circumstances described above, the UE entity may not receive a NAS message from a specific entity in the core network.

SUMMARY

Accordingly, the present disclosure provides an apparatus and method capable of properly transmitting/receiving a NAS message between a UE and a network entity in a core network.

According to the present disclosure there is provided an apparatus and method as set forth in the appended claims. Other features of the present disclosure will be apparent from the dependent claims, and the description which follows.

According to a first aspect of the present disclosure, there is provided a method of controlling timer T3440 or T3540 in a User Equipment, UE, the timer being operable to guard a time during which the UE maintains a certain type of connection to a telecommunication network, wherein the timer has a default first time period in the absence of a first condition and a second condition being met, wherein if both the first condition and the second condition are met, then the first default time period is extended to a second time period.

In an embodiment, the first condition is determining if the UE is operating in one or more predefined modes or whether a certain mode or feature is restricted or not.

In an embodiment, the certain mode is one or more of:
enhanced coverage is not restricted for the UE;
CE mode B is not restricted;
CE mode A is not restricted;
CE mode A and CE mode B is not restricted;
The UE is operating in NB-N1 mode or in NB-S1 mode; and
the UE is accessing the telecommunication network via a satellite.

In an embodiment, the timer is T3540, and the second condition is one of:
i. the UE receives a SERVICE ACCEPT message;
ii. the UE did not set the Service type information element (IE) to "signalling" or "high priority access", the UE has not included the Uplink data status IE in the SERVICE REQUEST message, or the UE has included the Uplink data status IE in the SERVICE REQUEST message, but the SERVICE REQUEST message indicates that no user-plane resources of any PDU sessions are to be re-established;
iii. the UE has not included the Allowed PDU session status IE or has included the Allowed PDU session status IE indicating there is no PDU session for which the UE allowed the user-plane resource to be re-established over 3GPP access in the SERVICE ACCEPT message, or the UE has included the Allowed PDU session status IE in the SERVICE REQUEST message but the SERVICE ACCEPT message does not indicate that any user-plane resources of any PDU sessions are to be re-established;
iv. the service request procedure has been initiated in 5GMM-IDLE mode;
v. the user-plane resources for PDU sessions have not been set up; and
vi. the UE need not request resources for V2X communication over PC5 reference point;

In an embodiment, the timer is T3440, and the second condition is one of:
vii. the UE sent a CONTROL PLANE SERVICE REQUEST message;
viii. Control plane service type indicated "mobile terminating request", or the Control plane service type did not indicate "mobile originating request";
ix. an "Active" flag bit in the Control plane service type IE is set to "No radio bearer establishment requested" or the "Active" flag bit in the Control plane service type IE is not set to "Radio bearer establishment requested";
x. user plane radio bearers have not been set up;
xi. the UE is using control plane CIoT EPS optimization;
xii. the Control Plane Service Request message did not include the ESM message container IE or the NAS message container IE; and
xiii. the Control Plane Service Request message includes the ESM message container IE but the DDX field in the Release assistance indication IE is set to a value that indicates "No further uplink and no further downlink data transmission subsequent to the uplink data transmission is expected".

In an embodiment, the first default time period is 10 s.

In an embodiment, the timer relates to controlling a NAS connection to the telecommunication network.

In an embodiment, a difference between the first and second periods is an additional time period and is determined by the telecommunication network.

According to a second aspect of the present disclosure, there is provided a method of controlling timer T3575 in a telecommunication network, the timer being operable to guard a time that is associated with a NAS procedure or transmission of a NAS message, wherein the timer has a default first time period in the absence of a first condition wherein the default period is replaced by an extended second time period if it is determined that the first condition is met.

In an embodiment, the first condition is determining if an associated UE is operating in one or more predefined modes or whether a certain mode or feature is restricted or not for the UE.

In an embodiment, the certain mode is one or more of:
enhanced coverage is not restricted for the UE;
CE mode B is not restricted;
CE mode A is not restricted;
CE mode A and CE mode B is not restricted;
The UE is operating in NB-N1 mode or in NB-S1 mode; and
the UE is accessing the telecommunication network via a satellite.

According to a third aspect of the present disclosure, there is provided a UE operable to perform the method of the first aspect.

According to a fourth aspect of the present disclosure, there is provided network component operable to perform the method of the second aspect.

In an embodiment, the component is an AMF.

Although a few preferred embodiments of the present disclosure have been shown and described, it will be appreciated by those skilled in the art that various changes and modifications might be made without departing from the scope of the disclosure, as defined in the appended claims.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a better understanding of the present disclosure, and to show how embodiments of the same may be carried into effect, reference will now be made, by way of example only, to the accompanying diagrammatic drawings in which.

DETAILED DESCRIPTION

Figure 1:
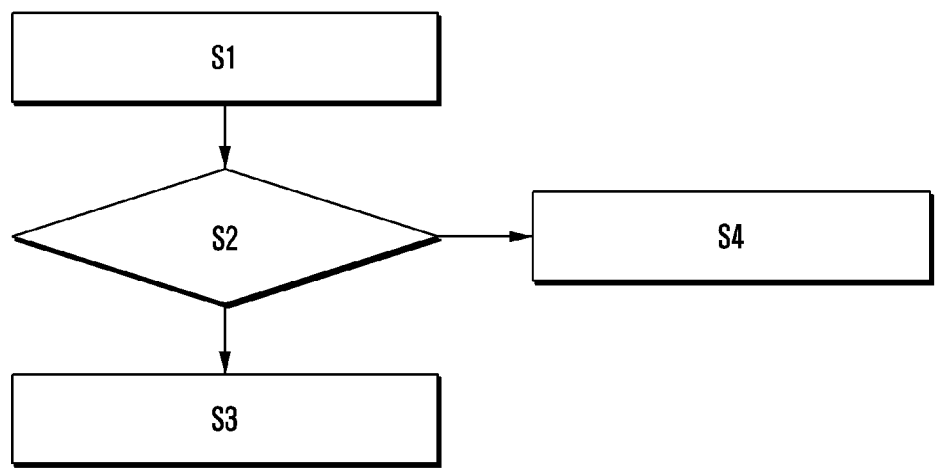
FIG. 1 shows a flowchart illustrating operation of an embodiment of the present disclosure for a first type of timer.

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

First, a timer for an NSA message according to the current standard will be described below.

The UE starts a timer known as T3540 when one or more conditions are met as specified in TS 24.501 V17.1.0. The timer T3540 guards the time during which the UE keeps the NAS connection and leaves the decision to the network to release the NAS signaling connection. Upon the expiry of T3540, the UE then releases the NAS signaling connection. The current length of T3540 is 10 s and it does not vary.

For example, the following is specified in TS 24.501 V17.1.0 regarding T3540:

"To allow the network to release the N1 NAS signalling connection, the UE:

. . . .

f) shall start the timer T3540 if:

1) the UE receives a SERVICE ACCEPT message;
2) the UE did not set the Service type Information Element, IE, to "signalling" or "high priority access", the UE has not included the Uplink data status IE in the SERVICE REQUEST message, or the UE has included the Uplink data status IE in the SERVICE REQUEST message, but the SERVICE REQUEST message indicates that no user-plane resources of any Protocol Data Unit, PDU, sessions are to be re-established;
3) the UE has not included the Allowed PDU session status IE or has included the Allowed PDU session status IE indicating there is no PDU session(s) for which the UE allowed the user-plane resource to be re-established over 3GPP access in the SERVICE ACCEPT message, or the UE has included the Allowed PDU session status IE in the SERVICE REQUEST message but the SERVICE ACCEPT message does not indicate that any user-plane resources of any PDU sessions are to be re-established;
4) the service request procedure has been initiated in 5GMM-IDLE mode;
5) the user-plane resources for PDU sessions have not been set up; and 6) the UE need not request resources for V2X communication over PC5 reference point (see 3GPP TS 23.287 [6C]);"

When T3540 is running, the UE stops it when certain conditions are met. For example, the UE stops the timer if a DL NAS TRANSPORT is received for case f) that is listed above. The condition to stop the timer for case f), based on the reception of a DL NAS TRANSPORT message, is specified in TS 24.501 V17.1.0 as follows:

"In case b) and f),
upon an indication from the lower layers that the user-plane resources for Protocol Data Unit, PDU, sessions are set up, the UE shall stop timer T3540 and may send uplink signalling via the existing N1 NAS signalling connection or user data via user plane. If the uplink signalling is associated with emergency services fallback only for a UE in 3GPP access or establishing an emergency PDU session, the UE shall stop timer T3540 and send the uplink signalling via the existing N1 NAS signalling connection;
upon receipt of a DEREGISTRATION REQUEST message, the UE shall stop timer T3540 and respond to the network-initiated de-registration request via the existing N1 NAS signalling connection as specified in subclause 5.5.2.3;
upon receipt of a message of a network-initiated 5GMM common procedure, the UE shall stop timer T3540 and respond to the network-initiated 5GMM common procedure via the existing N1 NAS signalling connection as specified in subclause 5.4;
if there are no user-plane resources established for PDU sessions, upon receiving a request from the upper layers to perform emergency services fallback only for a UE in 3GPP access or establishing an emergency PDU session, the UE shall stop timer T3540 and shall locally release the N1 NAS signalling connection, before proceeding as specified in subclause 5.6.1;
if there are no user-plane resources established for PDU sessions, upon receiving a request from the upper layers to perform services other than emergency services fallback only for a UE in 3GPP access or establishing an emergency PDU session, the UE shall wait for the local release of the established N1 NAS signalling connection upon expiry of timer T3540 or wait for timer T3540 being stopped, before initiating NAS signalling; or
upon receipt of a DL NAS TRANSPORT message, the UE shall stop timer T3540 and may send uplink signalling via the existing N1 NAS signalling connection."

Note that the UE behaves in a similar manner in Evolved Packet System (EPS) (i.e., when the UE is in S1 mode), however the timer is here called T3440. However, the length of T3440 is also 10 s.

The use of enhanced coverage in Fifth Generation Systems, 5GS, leads to the extension of the 5GMM and 5GSM NAS timers as described in TS 24.501 V17.1.0. For example, while in NB-N1 mode, if the use of enhanced coverage is not restricted (i.e., it is allowed), then the 5GMM NAS timers are increased by 240 s and the 5GSM NAS timers are extended by 180 s.

For WB-N1 mode, if coverage enhancement usage is not restricted (i.e., it is permitted), or if CE mode B is not restricted for the UE, then the UE also applies extended 5GMM NAS timers and extended 5GSM NAS timers. However, in this mode, the extended timers are dependent upon the procedure, unlike the extension by a fixed value as is the case with NB-N1 mode referred to above. For example, for the WB-N1 mode timer extension, the UE sets the value of the timer T3510, which guards the registration procedure (i.e., the timer is started after the UE sends the Registration Request message), to 85 s instead of 15 s when the timer extension is not applied. However, the service request procedure related timer, T3517, is set to 61 s due to NAS timer extension but set to 15 s if the NAS timers are not extended. Hence, the extended NAS timers for a UE in WB-N1 mode varies based on the procedure in question.

It should also be noted that the NAS timers are also extended at the network side as well. For example, the Session management Function, SMF, sets the value of T3591 to 24 s (after sending the PDU Session Modification Command message) which is the extended timer value, while the non-extended timer value (e.g., when enhanced coverage is not permitted for the UE) would be 16 s.

A problem experienced in the prior art is that the fixed value of 10 s for T3540 and/or T3440 does not work when the NAS timers are extended in N1 mode and/or S1 mode.

Using a fixed value of 10 s for T3540 does not work in all cases and can lead to early release of the NAS signalling connection by the UE which would then, in turn, lead to more signalling in the network as the UE would need to be paged again. This is undesirable.

For example, consider case f) from TS 24.501 V17.1.0 that was described previously. In this case, the UE starts the timer T3540 after receiving the Service Accept message while certain conditions are also met. For example, the UE did not set the Service type IE to "signalling" or "high priority access" in the Service Request message is one of the conditions that should be met. On this particular condition, not setting the Service type IE to the listed values means that the UE may have set the Service type IE to "mobile terminating request", which means that the UE has sent the Service Request message in response to paging. If the UE is paged, then it is because there is either pending downlink signalling or data. In the case of signaling, it may be 5GSM session management signalling from at least one SMF. For example, the SMF may have a PDU Session Modification Command to send to the UE. Additionally, if the UE and the network are both applying extended NAS timers, then the SMF will use a longer timer for this message which means that the message requires more time to arrive at the UE. As such, in this example, the related timer T3591 is set to 24 s. However, the UE starts T3540 after receiving the Service Accept message. If indeed the 5GSM message takes, say 12 s, for it to arrive to the UE, then timer T3540 which is 10 s long would have expired and therefore the UE would have already released the NAS connection. Eventually, the 5GSM message does not arrive at the UE, the T3591 expires at the SMF, prompting a re-transmission of the 5GSM message, and then the Access and Mobility management Function, AMF, will need to page the UE again. As such, there will be delays in sending the 5GSM message, there will be extra signalling in the network due to additional paging and NAS message retransmission, all of which will impact the user experience. Note that this is only one example but there may be other examples of delayed message transmission as well which may be even more serious.

For example, after paging a UE, the AMF must allocate a new 5G—Global Unique Temporary Identifier (GUTI) as stated in TS 24.501 V17.1.0:

"This procedure shall be initiated by the network to assign a new 5G-GUTI to the UE after:
- a) a successful service request procedure invoked as a response to a paging request from the network and before the:
  1) release of the N1 NAS signalling connection; or
  2) suspension of the N1 NAS signalling connection due to user plane CIoT 5GS optimization i.e., before the UE and the AMF enter 5GMM-IDLE mode with suspend indication; or
- b) the AMF receives an indication from the lower layers that the RRC connection has been resumed for a UE in 5GMM-IDLE mode with suspend indication and this resumption is a response to a paging request from the network, and before the:
  1) release of the N1 NAS signalling connection; or
  2) suspension of the N1 NAS signalling connection due to user plane CIoT 5GS optimization i.e., before the UE and the AMF enter 5GMM-IDLE mode with suspend indication.

If the service request procedure was triggered due to 5GSM downlink signalling pending, the procedure for assigning a new 5G-GUTI can be initiated by the network after the transport of the 5GSM downlink signalling."

As such, to allocate a new 5G-GUTI, the AMF will use an extended NAS timer if coverage enhancement is in use e.g., in NB-N1 mode. In this mode, the NAS message takes a longer time to arrive, much longer than 10 s which is the duration of T3540. Therefore, the UE may go back to idle mode after T3540 expires and the network will have to page the UE again. In fact, this particular issue is more of a concern since the 5G-GUTI must be allocated before the NAS connection is released after paging the UE as described above. Therefore, if the T3540 expires then the network will page the UE twice with the same 5G-GUTI which does not happen.

Further, the timer T3575 is never extended with other NAS timers are extended. The value of T3575, which is related to the transmission of the NETWORK SLICE-SPECIFIC AUTHENTICATION COMMAND message, is currently always set to 15 s even when all other NAS timers are extended at the network side. However, this causes a problem, since the use of coverage enhancement, or CE Mode A, or CE mode B, or CE Mode A and CE Mode B, requires longer timers due to delays in the lower layer transmissions. If the network does not extend the value of T3575 when:
- enhanced coverage is not restricted for the UE (e.g., in NB mode e.g., NB-S1 mode or NB-N1 mode, or e.g. in WB-S1 or WB-N1 mode), or
- CE mode B is not restricted, or
- CE mode A is not restricted, or
- CE mode A and CE mode B is not restricted
- then the timer T3575 will expire earlier than required. This will lead to unnecessary re-transmission from the AMF which may also fail yet another time. As such, a problem is experienced or likely whereby a correct value for T3575 is not assigned.

Still further, there are other cases in which the timer should be started and that are not currently listed herein. This includes cases where the conditions to start T3540 and/or T3440 are not complete.

In various embodiments of the present disclosure, steps are taken to extend the value of T3540 (in 5GS) and T3440 (in EPS) based on the UE's mode of operation:

The details set out herein apply to both N1 mode (5GS) and S1 mode (EPS), where the timer is identified by T3540 and T3440 respectively. As such, if not stated, any detail herein can apply in the same manner for both 5GS and/or EPS and for both T3450 and/or T3440, as required by the circumstances. As such, if one timer or mode is stated explicitly, then this should not be considered to be a limitation of the solution to the stated mode or timer name only. As such the embodiment described can apply equally or in a similar manner to the other mode or timer.

In an embodiment, the value of the timer T3540 or T3440 is determined, or set, depending on the mode of operation of the UE or depending on whether a feature is not restricted (or restricted) for the UE.

For example, if the use of:
- enhanced coverage is restricted for the UE (e.g., in NB mode e.g., NB-S1 mode or NB-N1 mode, or e.g., in WB-S1 or WB-N1 mode), or
- CE mode B is restricted, or
- CE mode A is restricted, or
- CE mode A and CE mode B is restricted
- then the UE applies a normal or prior art (i.e., unextended) timer value for T3540 and/or T3440 i.e., the non-extended value which is 10 s.

For example, if the use of:
- enhanced coverage is not restricted for the UE (e.g., in NB mode e.g., NB-S1 mode or NB-N1 mode, or e.g. in WB-S1 or WB-N1 mode), or
- CE mode B is not restricted, or
- CE mode A is not restricted, or
- CE mode A and CE mode B is not restricted
- then the UE applies an extended value for T3540 and/or T3440 i.e., a value which is greater than 10 s.

In additional embodiments, whenever the UE applies (or uses) the extended (5GMM and 5GSM, or EMM and ESM) NAS timers e.g., due to enhanced coverage not being restricted for the UE, or CE mode B is not restricted for the UE, or CE mode A and CE mode B is not restricted for the UE, then the UE also uses an extended value for T3540 and/or T3440, where this extended value is greater than 10 s.

Otherwise, if the UE is using non-extended (5GMM and 5GSM, or EMM and ESM) NAS timers, e.g., due to enhanced coverage being restricted for the UE, or CE mode B is restricted for the UE, or CE mode A and CE mode B is restricted for the UE, or if the UE does not support this feature, then the UE also uses a non-extended value for T3540 and/or T3440, where this value is 10 s.

As such, whenever the UE's mode of operation with respect to enhanced coverage, CE mode B, or CE mode A, or CE mode A and CE mode B, is updated, then the UE also updates the value that should be used for T3540 and/or T3440 as described above.

Note that the above applies to NB mode and WB mode, i.e., when the UE is operating in any of the following modes: NB-N1 mode, NB-S1 mode, WB-N1 mode, WB-S1 mode, wherein for WB-N1 mode or WB-S1 mode the UE may be additionally operating in CE mode B, or CE mode A, or CE mode A and CE mode B. In any of these modes, the corresponding timer is T3540 or T3440 and hence the proposals would apply to the corresponding timer accordingly.

When the UE determines to use an extended value for T3540 and/or T3440 as described above, the UE should apply a value that is greater than 10 s for this timer (i.e., the UE sets the value of T3540 to a value that is greater than 10 s).

The determination of the extended value for T3540 and/or T3440 may be achieved in any one of a number of ways.

In a first case, the extended value may be based on the UE mode of operation. For example, if the UE is operating in NB mode (e.g., NB-N1 mode or NB-S1 mode or CE mode B, or CE mode A, or CE mode A and CE mode B, or e.g., when any of these modes is not restricted for the UE, or when coverage enhancement is not restricted for the UE), the UE may use an extended value for T3540 and/or T3440. For instance, the UE may extend the length of: T3540 by 180 s or 240 s, or any other fixed value say M seconds, where M is an integer; T3440 by 180 s or 240 s, or any other fixed value say M seconds, where M is an integer.

In a second case, if the UE is operating in WB mode (e.g., WB-S1 mode or WB-N1 mode, or CE mode B, or CE mode A, or CE mode A and CE mode B, or e.g., when any of these modes is not restricted for the UE, or when coverage enhancement is not restricted for the UE), then the UE may use an extended value for T3540 and/or T3440.

For example, the UE may extend the length of T3540 by any fixed value, e.g., by M seconds, where M is an integer. Alternatively, the value of T3540 may be set to a value of another existing extended (5GMM or 5GSM) NAS timer, or a value that is greater than any other existing extended (5GMM or 5GSM) NAS timer. For instance, the existing extended (5GMM or 5GSM) NAS timer may be an existing (5GMM or 5GSM) NAS timer that is a timer on the UE side, or that is a timer on the network side (i.e., AMF or SMF). For example, the timer may be set to be 24 s, or 34 s, etc.

In another example, the UE may extend the length of T3440 by any fixed value, the same M seconds, where M is an integer. Alternatively, the value of T3440 may be set to a value of another existing extended (EMM or ESM) NAS timer, or a value that is greater than any other existing extended (EMM or ESM) NAS timer. For example, the existing extended (EMM or ESM) NAS timer may be an existing (EMM or ESM) NAS timer that is a timer on the UE side, or that is a timer on the network side (i.e., MME). For example, the timer may be set to be 24 s, or 34 s, etc.

Accordingly, when the UE is applying extended NAS timers (for 5GMM, 5GSM, EMM or ESM), then the UE also uses or applies an extended value for T3540 and/or T3440. The extended value for T3540 and/or T3440 may depend on the mode of operation of the UE, or whether a certain mode or feature is restricted or not restricted for the UE. The mode may be the use of enhanced coverage, or CE mode B, or CE mode A, or CE mode A and CE mode B, where the UE may be in NB-N1 mode, NB-S1 mode, WB-N1 mode, or WB-S1 mode. The extended value may be based on any of the modes or may be a predetermined fixed value which may in turn depend on the mode as described herein.

When the UE uses extended NAS timers, the UE may also determine to use an extended value for T3540 and/or T3440, where the extended value is a value that is greater than 10 s. When the UE uses non-extended NAS timers, then the UE may also determine to use non-extended value for T3540 and/or T3440 which is 10 s. The UE updates its determination for the value of T3540 and/or T3440 whenever the UE updates its usage for extended or non-extended NAS timers or when the UE mode of operation, e.g., as described herein, is updated.

FIG. 1 shows an example of the operation of an embodiment of the present disclosure. Note that the figure is not to be considered to be restricted to the particular steps that are displayed, noting that any of the steps described may occur in any combination and/or order.

At step S1, the UE determines to maintain its NAS signalling connection for the duration of a timer (e.g., T3540 or T3440, in N1 or S1 mode, respectively).

At step S2, the UE verifies one or more condition (such as coverage enhancement is restricted or not, CE mode B is restricted or not, CE mode A and CE mode B is restricted or not, NAS timers are extended or not), based on which, the value of T3540/T3440 should be determined to be non-extended or extended.

In the event that one or more condition is not satisfied (such as one of the listed modes above is restricted for the UE), then at step S3, the UE determines the length of T3540 or T3440 to be the non-extended value e.g., 10 s. The UE then starts the timer with its value set to the non-extended value e.g., 10 s.

However, if at step S2, one or more conditions is satisfied, e.g., one of the listed modes is not restricted for the UE, then at S4, the UE determines that the length of T3540/T3440 is to be an extended value. The UE may further check for one or more other conditions to determine the actual extended value to use for the timer. The timer is then started with this determined value, e.g., 180 s or 240 s if the UE is in NB-N1 or NB-S1 mode, or 24 s or 34 s if the UE is in WB-N1 or WB-S1 mode.

In another embodiment, the UE may extend the timer if, optionally, any of the above conditions is met, in any combination and/or order, and, optionally, depending on another of the following conditions.

A first condition being a specific type of procedure being performed or that is ongoing. For example, if the procedure is a service request procedure or a registration procedure, or any other procedure, then the UE takes a specific action where, for example, the UE decides to extend the timer (or not) when, for example, the UE has determined to start the timer.

A second condition being the type of message that the UE received, which then leads to the start of the timer. For example, if the UE received a Service Accept message, a Registration Accept message, a Configuration Update Command message, or any other message that may be defined. Optionally, the reception of the message may additionally be checked for other conditions that may lead to the start of the timer where, if these conditions are met, the UE takes a specific action where, for example, the UE decides to extend the timer (or not) when, for example, the UE has determined to start the timer For example, if the message is a Service Accept message, the UE extends the timer when any of the following conditions are met, noting that other conditions may be added or removed from the following list:
  the UE receives a SERVICE ACCEPT message;
  the UE did not set the Service type IE to "signalling" or "high priority access", the UE has not included the Uplink data status IE in the SERVICE REQUEST message, or the UE has included the Uplink data status IE in the SERVICE REQUEST message, but the SERVICE REQUEST message indicates that no user-plane resources of any PDU sessions are to be re-established;
  the UE has not included the Allowed PDU session status IE or has included the Allowed PDU session status IE indicating there is no PDU session(s) for which the UE allowed the user-plane resource to be re-established over 3GPP access in the SERVICE ACCEPT message, or the UE has included the Allowed PDU session status IE in the SERVICE REQUEST message but the SER- VICE ACCEPT message does not indicate that any user-plane resources of any PDU sessions are to be re-established;

the service request procedure has been initiated in 5GMM-IDLE mode;

the user-plane resources for PDU sessions have not been set up; and the UE need not request resources for V2X communication over PC5 reference point (see 3GPP TS 23.287).

For example, if the message is a Registration Accept message, the UE extends the timer when any of the following conditions are met, noting that other conditions may be added or removed from the following list:

the UE receives a REGISTRATION ACCEPT message which does not include a Pending Network Slice Selection Assistance Information (NSSAI) IE or UE radio capability ID deletion indication IE;

the UE has set the Follow-on request indicator to "No follow-on request pending" in the REGISTRATION REQUEST message;

the UE has not included the Uplink data status IE in the REGISTRATION REQUEST message, or the UE has included the Uplink data status IE in the REGISTRATION REQUEST message, but the REGISTRATION ACCEPT message indicates that no user-plane resources of any PDU sessions are to be re-established;

the UE has not included the Allowed PDU session status IE or has included the Allowed PDU session status IE indicating there is no PDU session(s) for which the UE allowed the user-plane resource to be re-established over 3GPP access in the REGISTRATION REQUEST message, or the UE has included the Allowed PDU session status IE in the REGISTRATION REQUEST message but the REGISTRATION ACCEPT message does not indicate that any user-plane resources of any PDU sessions are to be re-established;

the registration procedure has been initiated in 5GMM-IDLE mode;

the user-plane resources for PDU sessions have not been set up; and the UE need not request resources for V2X communication over PC5 reference point (see 3GPP TS 23.287).

For example, if the message is a Configuration Update Command message, the UE extends the timer when any of the following conditions are met, noting that other conditions may be added or removed from the following list:

the UE receives a CONFIGURATION UPDATE COMMAND message containing the Configuration update indication IE with the Registration bit set to "registration requested" and with either new allowed NSSAI information or new configured NSSAI information or both included; the network slicing subscription change indication; or no other parameters;

the user-plane resources for PDU sessions have not been set up; and no emergency PDU session has been established.

For example, the condition may be that UE has started the timer based on other conditions such as, but not limited to, the UE has done any of the following:

Resumed the NAS connection that was suspended i.e., resumption of a connection from 5GMM-CONNECTED mode with RRC inactive; and Resumed the NAS connection from 5GMM-IDLE mode with suspend indication, optionally where the UE may have resumed the connection in response to paging; where the UE may have not sent any NAS message in response to the paging message; or where the UE may have sent a NAS message in response to the paging message.

Note that the conditions above are exemplary only and additional conditions may be defined for embodiments, as required. As such the conditions may be any combination of those listed above. When the condition or conditions are met, optionally when the UE has determined to start T3540 and/or T3440, the UE may then determine to apply an extended timer value for T3540 and/or T3440.

Note that the above are examples of some conditions that the UE may check, based on which, the UE may determine to use the extended timer. In summary, the UE may determine to start T3540 under a certain condition, amongst a set of conditions, and the UE may further verify if one or more other conditions are met, based on which the UE may further determine if the timer needs to be extended. Note that this determination may also involve the verification of other conditions as stated earlier or herein.

For example, the UE that is operating under a certain mode such as enhanced coverage (i.e., where enhanced coverage is not restricted), the UE, although in this mode, may further verify one or more other conditions as set out above. The UE may then decide to extend, or not extend, the value of the timer (T3540 and/or T3440) based on the one or more other conditions.

Therefore, it is not always the case that if the UE is operating in enhanced coverage (i.e., enhanced coverage is not restricted, or CE mode B is not restricted, or CE mode A and CE mode B is not restricted), that the UE will automatically extend the timer. The UE may decide to extend the timer (or not extend the timer) based on the additional conditions as described above.

The conditions set out above apply for any feature such as enhanced coverage, CE mode B, Ce mode A, CE mode A and CE mode B. The proposals apply for any timer such as, but not limited to, T3540 and/or T3440.

The UE may decide to apply an extended value (or not apply an extended value) for the timer (e.g., T3540 and/or T3440) based on any combination of conditions that are disclosed herein, noting that the conditions may be verified and are not restricted only to those conditions listed herein. This determination may be done every time the UE decides to start the timer e.g., T3540 or T3440.

In certain conditions, the value of timer T3575 may be extended. The AMF may verify certain conditions, which if met, can lead to the determination of the appropriate value for T3575 as set out below.

For example, in the event of the use of any of the following, then the AMF should apply or use a non-extended value for T3575, i.e., 15 s:

enhanced coverage is restricted for the UE (e.g., in NB mode e.g., NB-S1 mode or NB-N1 mode, or e.g. in WB-S1 or WB-N1 mode), or CE mode B is restricted, or CE mode A is restricted, or CE mode A and CE mode B is restricted.

However, in the event of the use of any of the following, then the AMF applies an extended value for T3575:

enhanced coverage is not restricted for the UE (e.g., in NB mode e.g., NB-S1 mode or NB-N1 mode, or e.g., in WB-S1 or WB-N1 mode), or CE mode B is not restricted, or CE mode A is not restricted, or CE mode A and CE mode B is not restricted.

Alternatively, when the network (e.g., AMF) uses extended NAS timers for the UE, then the network (e.g., AMF) should use an extended value for T3575.

When the network (e.g., AMF) determines to use an extended value for T3575, then the network (e.g., AMF) should use a value that is larger than 15 s.

The network (e.g., AMF) may extend the value of the timer by a fixed value e.g., the network (e.g., AMF) adds a fixed value to 15 s, where the fixed value may be 180 s or 240 s, or any integer M representing seconds.

The fixed value may be determined based on the mode of operation of the UE e.g., when the UE is operating in NB-N1 mode then the fixed value may be different. Optionally, when any of the listed modes of operations (enhanced coverage, CE mode A, CE mode B, CE mode A and CE mode B) are not restricted for the UE. For example, in this case, the network (e.g., AMF) may extend the value of T3575 by 180 s or any other fixed value of M seconds, where M is an integer.

The fixed value may a predetermined value such as 45 s, 24 s, 30 s, etc, or any other value of M seconds, where M is an integer. This value may be used, e.g., based on the mode of operation of the UE such as the UE being in WB-N1 mode, optionally when additionally, any of the listed modes of operations (enhanced coverage, CE mode A, CE mode B, CE mode A and CE mode B) are not restricted for the UE.

Figure 2:
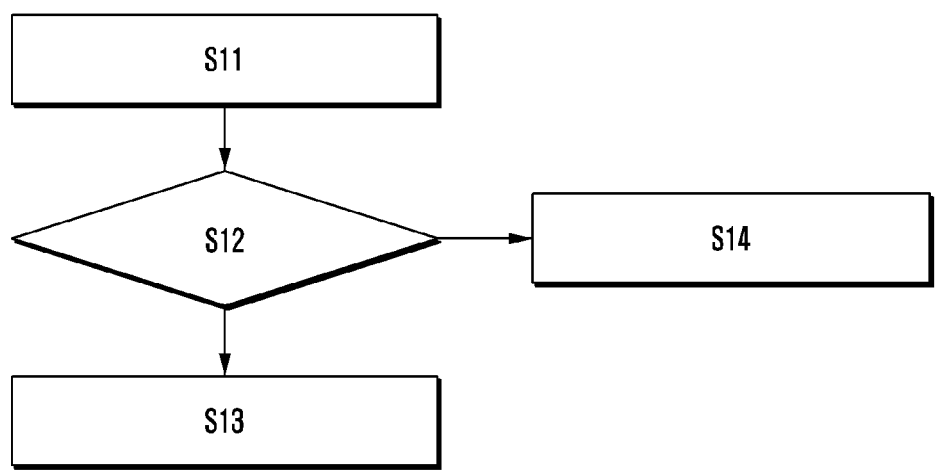
FIG. 2 shows a flowchart illustrating operation of an embodiment of the present disclosure for a second type of timer.

FIG. 2 shows a flowchart which illustrates how the network (e.g., AMF) determines the length of timer T3575. It is similar in some ways to the flowchart of FIG. 1, which relate to timer T3540 or T3440.

At step S1, the network (e.g., AMF) determines to start the timer T3575.

As step S12, the network checks for one or more conditions for the UE in question, (for example coverage enhancement is restricted or not, CE mode B is restricted or not, CE mode A and see CE mode B is restricted or not, NAS timers are extended or not) based on which, the value of T3575 should be determined to be non-extended or extended.

If the one or more conditions are satisfied e.g., one of the listed modes above is not restricted for the UE then, at step S13, the network determines that the length of T3575 is to be extended. The network may further check for one or more other conditions to determine the actual extended value for the timer. The timer is then started with this determined extended value which is, for example, 180 s or 240 s if the UE is in NB-N1/NB-S1 mode or 24 s or 34 s if the UE is in WB-N1 or WB-S1 mode.

If the one or more conditions are not satisfied at step S12 because, for instance, one of the listed modes is restricted for the US, then at step S14, the network determines the length if T3575 to be the non-extended value e.g., 10 s. The UE then starts the timer with its value set to the non-extended value.

There are further conditions which may relate to the starting of T23540 and/or T3440. For instance, timer T3540 may be started when any of the following combinations of events or conditions occur:
 The UE transitions from 5GMM-IDLE mode with suspend indication to 5GMM-CONNECTED mode, optionally after the UE receives an indication from the lower layers that the RRC connection has been resumed, where optionally the UE did not send a Service Request message or a Control Plane Service Request message or a Registration Request message
 The UE applies any of the previous conditions/determinations to determine whether T3540 should be extended After T3540 is started, the UE should stop T3540 if any of the following combinations of conditions occur:
 upon an indication from the lower layers that the user-plane resources for PDU sessions are set up, the UE shall stop timer T3540 and may send uplink signalling via the existing N1 NAS signalling connection or user data via user plane. If the uplink signalling is associated with emergency services fallback only for a UE in 3GPP access or establishing an emergency PDU session, the UE shall stop timer T3540 and send the uplink signalling via the existing N1 NAS signalling connection;
 upon receipt of a DEREGISTRATION REQUEST message, the UE shall stop timer T3540 and respond to the network-initiated de-registration request via the existing N1 NAS signalling connection as specified in subclause 5.5.2.3 of TS 24.501;
 upon receipt of a message of a network-initiated 5GMM common procedure, the UE shall stop timer T3540 and respond to the network-initiated 5GMM common procedure via the existing N1 NAS signalling connection as specified in subclause 5.4 of TS 24.501;
 if there are no user-plane resources established for PDU sessions, upon receiving a request from the upper layers to perform emergency services fallback only for a UE in 3GPP access or establishing an emergency PDU session, the UE shall stop timer T3540 and shall locally release the N1 NAS signalling connection, before proceeding as specified in subclause 5.6.1 of TS 24.501;
 if there are no user-plane resources established for PDU sessions, upon receiving a request from the upper layers to perform services other than emergency services fallback only for a UE in 3GPP access or establishing an emergency PDU session, the UE shall wait for the local release of the established N1 NAS signalling connection upon expiry of timer T3540 or wait for timer T3540 being stopped, before initiating NAS signalling;
 upon receipt of a DL NAS TRANSPORT message, the UE shall stop timer T3540 and may send uplink signalling via the existing N1 NAS signalling connection; or
 upon any other set of conditions that may be defined in the future such that the timer T3540 is required to be stopped when the set of condition is met (where the condition may be one or more conditions).

Timer T3440 may be started when any of the following combinations of events or conditions occur. The UE transitions from EMM-IDLE mode with suspend indication to EMM-CONNECTED mode, optionally after the UE receives an indication from the lower layers that the RRC connection has been resumed, where optionally the UE did not send a Service Request message or a Control Plane Service Request message or a Tracking Area Update Request message.

The UE applies any of the previous conditions/determinations to determine whether T3440 should be extended or not.

After T3440 is started, the UE should stop T3440 if any of the following combinations of conditions occur:
 upon an indication from the lower layers that the user plane radio bearers are set up, the UE shall stop timer T3440 and may send uplink signalling via the existing NAS signalling connection or user data via the user plane bearers. If the uplink signalling is for CS fallback for emergency call, or for establishing a packet data network (PDN) connection for emergency bearer services, the UE shall send the uplink signalling via the existing NAS signalling connection;

upon receipt of a DETACH REQUEST message, the UE shall stop timer T3440 and respond to the network initiated detach as specified in subclause 5.5.2.3 of TS 24.301;

upon receiving a request from upper layers to send NAS signalling not associated with establishing either a CS emergency call or a PDN connection for emergency bearer services, the UE shall wait for the local release of the established NAS signalling connection upon expiry of timer T3440 or T3440 being stopped before proceeding;

upon receiving a request from upper layers to establish either a CS emergency call or a PDN connection for emergency bearer services, the UE shall stop timer T3440 and shall locally release the NAS signalling connection, before proceeding as specified in subclause 5.6.1 of TS 24.301;

upon receipt of ESM DATA TRANSPORT message, as an implementation option, the UE may reset and restart timer T3440;

upon receipt of a DOWNLINK NAS TRANSPORT or DOWNLINK GENERIC NAS TRANSPORT message, the UE which is in EMM-REGISTERED without PDN connections shall stop timer T3440 and may send uplink signalling via the existing NAS signalling connection;

upon receipt of an ACTIVATE DEFAULT EPS BEARER CONTEXT REQUEST, MODIFY EPS BEARER CONTEXT REQUEST, DEACTIVATE EPS BEARER CONTEXT REQUEST, DOWNLINK NAS TRANSPORT or DOWNLINK GENERIC NAS TRANSPORT message, if the UE is using control plane CIoT EPS optimization, the UE shall stop timer T3440 and may send uplink signalling via the existing NAS signalling connection; or upon any other set of conditions that may be defined in the future such that the timer T3540 is required to be stopped when the set of condition is met (where the condition may be one or more conditions).

The conditions set out above can be applied in any combination or in any order, where any of the listed condition is to be considered as an example only and not a limitation i.e., other conditions may be defined in the future and used in conjunction with any of the conditions herein. The description above can apply to T3540 and/or T3440 or any other timer that can be used for a similar purpose, with the specific timers referred to being exemplary only.

In a further embodiment, the UE may access the telecommunication network via at least one satellite. In effect, the RAN, by means of which access is provided to the core network, is satellite-based. This increases propagation delay and is another situation in which one or more timers, as set out herein, may benefit from being extended.

Figure 3:
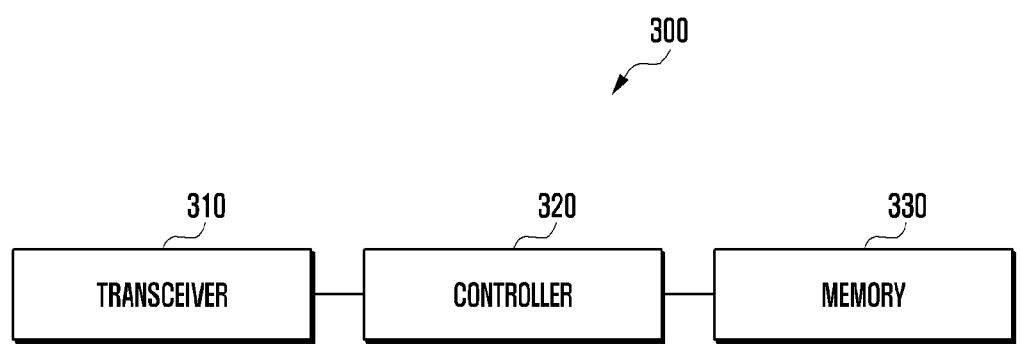
FIG. 3 illustrates the structure of a network entity according to an embodiment of the disclosure. The network entity of FIG. 3 may be, for example, any one network entity of core network.

FIG. 3 illustrates the structure of a network entity 300 according to an embodiment of the disclosure. The network entity 300 of FIG. 3 may be, for example, any type of network entity in the core network. For example, without limitation, the entity may be one of a base station supporting wireless communication, an AMF, a SMF, a Policy Control Function (PCF), a Network Data Analytics Function (NWDAF), a Network Exposure Function (NEF), a Unified Data Management (UDM), a Unified Data Repository (UDR), or a User Plane Function (UPF).

Referring to FIG. 3, the network entity 300 may include a transceiver 310, a controller 320, and a memory 330. In the disclosure, the controller 320 may be defined as a circuit, an application-specific integrated circuit, or at least one processor.

The transceiver 310 may transmit and receive signals to and from other network entities. And the transceiver 310 may transmit and receive signals to and from UE. In addition, when the network entity is a base station, the transceiver 310 may have a configuration for transmitting and receiving signals through a radio channel with the UE.

The controller 320 may control the overall operation of a network entity according to the embodiment proposed in the disclosure. For example, the controller 320 may control to operate according to the procedure of the network entity described above with reference to FIGS. 1 to 2. Specifically, the controller 320 may control the timer as described with reference to FIGS. 1 and 2 in the network entity of the mobile communication system according to an embodiment of the present disclosure.

The memory 330 may store at least one of information transmitted and received through the transceiver 310 and information generated through the controller 320. In addition, the memory 330 may store timer information, timer-related information, condition information, and the like.

Figure 4:
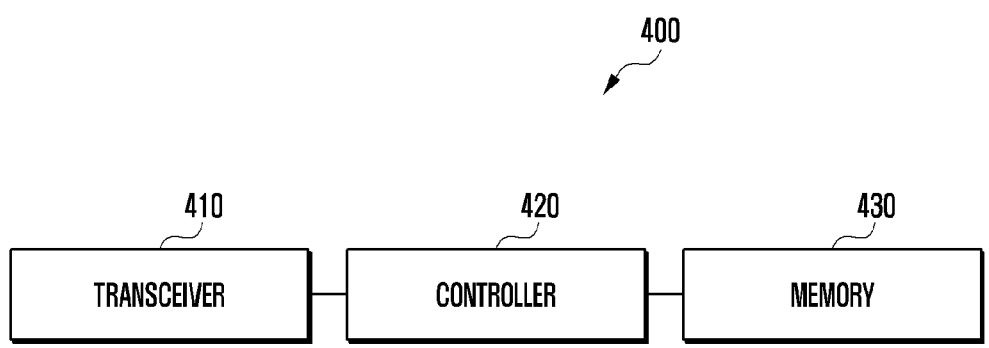
FIG. 4 illustrates the structure of a UE according to an embodiment of the disclosure.

FIG. 4 illustrates the structure of a UE 400 according to an embodiment of the disclosure.

Referring to FIG. 4, the UE 400 may include a transceiver 410, a controller 420, and a memory 430. In the disclosure, the controller 420 may be defined as a circuit, an application-specific integrated circuit, or at least one processor.

The transceiver 410 may transmit and receive signals to and from network entities. For example, the UE may transmit and receive signals to and from one of a base station supporting wireless communication, an AMF, a SMF, a PCF, a NWDAF, a NEF, a UDM, a UDR, or a UPF. In addition, the transceiver 410 may have a configuration for transmitting and receiving a signal through air to the base station.

The controller 420 may control the overall operation of a UE according to the embodiment proposed in the disclosure. For example, the controller 320 may control to operate according to the UE procedure described above with reference to FIGS. 1 to 2. Specifically, the controller 320 may control the timer as described with reference to FIGS. 1 and 2 in the UE 400 of the mobile communication system according to an embodiment of the present disclosure.

The memory 430 may store at least one of information transmitted and received through the transceiver 410 and information generated through the controller 320. In addition, the memory 430 may store timer information, timer-related information, condition information, and the like.

The UE 400 is not limited to the configuration illustrated in FIG. 4. The configuration of the UE 400 may further have an additional configuration in addition to the configuration illustrated in FIG. 4.

At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The present disclosure is not restricted to the details of the foregoing embodiment(s). The present disclosure extends to any novel one, or any novel combination, of the features disclosed in this specification (including any accompanying claims, abstract and drawings), or to any novel one, or any novel combination, of the steps of any method or process so disclosed.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for controlling a non-access stratum (NAS) timer by a user equipment (UE) in a wireless communication system, the method comprising:
    determining to start the NAS timer when at least one of a first set of conditions is satisfied;
    identifying whether at least one of a second set of conditions is satisfied before the NAS timer starts;
    setting a value of the NAS timer by adding a first time value to a default time value when the at least one of the second set of conditions is satisfied; and
    starting the NAS timer based on the value of the NAS timer,
    wherein the second set of conditions includes:
        the UE is in NB-N1 mode,
        the UE is in WB-N1 mode, and CE mode B is not restricted for the UE by a network, and
        the UE is in WB-N1 mode, and enhanced coverage is not restricted for the UE by the network.

2. The method of claim 1, wherein the first set of conditions includes:
    i. the UE receives a SERVICE ACCEPT message,
    ii. the UE did not set a Service type information element (IE) to "signalling" or "high priority access", the UE has not included an Uplink data status IE in a SERVICE REQUEST message, or the UE has included the Uplink data status IE in the SERVICE REQUEST message but the SERVICE ACCEPT message indicates that no user-plane resources of any PDU sessions are to be re-established,
    iii. the UE has not included an Allowed PDU session status IE or has included the Allowed PDU session status IE indicating there is no PDU session for which the UE allowed a user-plane resource to be re-established over 3GPP access in the SERVICE REQUEST message, or the UE has included the Allowed PDU session status IE in the SERVICE REQUEST message but the SERVICE ACCEPT message does not indicate that any user-plane resources of any PDU sessions are to be re-established,
    iv. a service request procedure has been initiated in 5GMM-IDLE mode,
    V. user-plane resources for PDU sessions have not been set up, and
    vi. the UE need not request resources for V2X communication over a PC5 reference point.

3. The method of claim 1, wherein the NAS timer is timer T3540.

4. The method of claim 1, wherein the default time value is 10 seconds, and the first time value is 240 seconds.

5. The method of claim 1, further comprising:
    setting the value of the NAS timer as the default time value when none of the second set of conditions are satisfied.

6. A user equipment (UE) for controlling a non-access stratum (NAS) timer in a wireless communication system, the UE comprising:
    a transceiver configured to communicate with a network entity of the wireless communication system;
    a memory; and
    a controller configured to:
        determine to start the NAS timer when at least one of a first set of conditions is satisfied,
        identify whether at least one of a second set of conditions is satisfied before the NAS timer starts,
        set a value of the NAS timer by adding a first time value to a default time value when the at least one of the second set of conditions is satisfied, and
        start the NAS timer based on the value of the NAS timer,
    wherein the second set of conditions includes:
        the UE is in NB-N1 mode,
        the UE is in WB-N1 mode, and CE mode B is not restricted for the UE by a network, and
        the UE is in WB-N1 mode, and enhanced coverage is not restricted for the UE by the network.

7. The UE of claim 6, wherein the first set of conditions includes:
    i. the UE receives a SERVICE ACCEPT message,
    ii. the UE did not set a Service type information element (IE) to "signalling" or "high priority access", the UE has not included an Uplink data status IE in a SERVICE REQUEST message, or the UE has included the Uplink data status IE in the SERVICE REQUEST message but the SERVICE ACCEPT message indicates that no user-plane resources of any PDU sessions are to be re-established, iii. the UE has not included an Allowed PDU session status IE or has included the Allowed PDU session status IE indicating there is no PDU session for which the UE allowed a user-plane resource to be re-established over 3GPP access in the SERVICE REQUEST message, or the UE has included the Allowed PDU session status IE in the SERVICE REQUEST message but the SERVICE ACCEPT message does not indicate that any user-plane resources of any PDU sessions are to be re-established, iv. a service request procedure has been initiated in 5GMM-IDLE mode, V. user-plane resources for PDU sessions have not been set up, and vi. the UE need not request resources for V2X communication over a PC5 reference point.

8. The UE of claim 6, wherein the NAS timer is timer T3540.

9. The UE of claim 6, wherein the default time value is 10 seconds, and the first time value is 240 seconds.

10. The UE of claim 6, wherein the controller is further configured to set the value of the NAS timer as the default time value when none of the second set of conditions are satisfied.

11. A method for controlling a non-access stratum (NAS) timer by an access and mobility management function (AMF) in a wireless communication system, the method comprising:

assigning a new global unique temporary identifier (GUTI) for a user equipment (UE);

paging to the UE;

identifying whether the UE meets a first set of conditions;

setting a value of the NAS timer by adding a first time value to a default time value to receive a response from the UE when the at least one of the first set of conditions is satisfied; and starting the NAS timer based on the value of the NAS timer;

wherein the first set of conditions includes:
the UE is in NB-N1 mode,
the UE is in WB-N1 mode and CE mode B is not restricted for the UE by a network, and
the UE is in WB-N1 mode and enhanced coverage is not restricted for the UE by the network.

12. The method of claim 11, further comprising:
setting the value of the NAS timer to the default time value when none of the first set of conditions are met.

13. The method of claim 11, wherein the NAS timer is T3575.

14. The method of claim 11, wherein the default time value is 15 seconds, and the first time value is 240 seconds.

15. An access and mobility management function (AMF) for controlling a non-access stratum (NAS) timer in a wireless communication system, the AMF comprising:

a transceiver configured to communicate with a user equipment (UE);

a memory; and a controller configured to:
assign a new global unique temporary identifier (GUTI) for the UE;
page to the UE;
identify whether the UE meets a first set of conditions;
set a value of the NAS timer by adding a first time value to a default time value to receive a response from the UE when the at least one of the first set of conditions is satisfied; and
start the NAS timer based on the value of the NAS timer;

wherein the first set of conditions includes:
the UE is in NB-N1 mode,
the UE is in WB-N1 mode and CE mode B is not restricted for the UE by a network, and
the UE is in WB-N1 mode and enhanced coverage is not restricted for the UE by the network.

16. The AMF of claim 15, wherein the controller is further configured to set the value of the NAS timer to the default time value when none of the first set of conditions are met.

17. The AMF of claim 15, wherein the NAS timer is T3575.

18. The AMF of claim 15, wherein the default time value is 15 seconds, and the first time value is 240 seconds.

* * * * *